(12) United States Patent
Sprainis et al.

(10) Patent No.: US 8,096,432 B2
(45) Date of Patent: Jan. 17, 2012

(54) ELASTOMERIC DRAFT GEAR HAVING A HOUSING

(75) Inventors: Ronald J. Sprainis, Springfield, OR (US); Michael E. Ring, Saint John, IN (US); Bradley Anderson, Des Plaines, IL (US); Jonathon Marlow, Hobart, IN (US)

(73) Assignee: WABTEC Holding Corp, Wilmerding, PA (US)

( * ) Notice: Subject to any disclaimer, the term of this patent is extended or adjusted under 35 U.S.C. 154(b) by 436 days.

(21) Appl. No.: 12/150,927

(22) Filed: May 1, 2008

(65) Prior Publication Data

US 2009/0308829 A1    Dec. 17, 2009

Related U.S. Application Data

(60) Provisional application No. 60/926,987, filed on May 1, 2007.

(51) Int. Cl.
*B61G 9/00* (2006.01)
(52) U.S. Cl. ..... 213/32 R; 213/26; 213/40 R; 213/75 R; 213/45
(58) Field of Classification Search ............... 213/22, 213/32 A, 32 R, 45, 47, 67 R, 68, 69, 70
See application file for complete search history.

(56) References Cited

U.S. PATENT DOCUMENTS

| | | | | |
|---|---|---|---|---|
| 761,795 A * | 6/1904 | Townsend | | 213/32 A |
| 1,852,486 A * | 4/1932 | Sleeman | | 213/32 R |
| 2,776,057 A * | 1/1957 | Blattner | | 213/46 R |
| 2,791,337 A * | 5/1957 | Blattner | | 213/45 |
| 2,801,010 A * | 7/1957 | Willison | | 213/45 |
| 2,817,445 A * | 12/1957 | Campbell | | 213/32 R |
| 2,858,030 A * | 10/1958 | Mulcahy | | 213/45 |
| 2,916,163 A | 12/1959 | Campbell | | |
| 3,178,036 A | 4/1965 | Cardwell | | |
| 3,447,693 A | 6/1969 | Cardwell | | |
| 3,799,360 A * | 3/1974 | Huml et al. | | 213/22 |
| 3,840,126 A * | 10/1974 | Domer | | 213/45 |
| 4,095,065 A * | 6/1978 | Akers | | 200/400 |
| 4,198,037 A * | 4/1980 | Anderson | | 267/153 |
| 4,556,678 A | 12/1985 | Hsiao | | |
| 4,576,295 A | 3/1986 | Carlstedt | | |
| 4,591,059 A | 5/1986 | Hammarlund | | |
| 4,645,187 A | 2/1987 | Kanjo et al. | | |

(Continued)

FOREIGN PATENT DOCUMENTS

DE    1993283    9/1968

*Primary Examiner* — Joe Morano, IV
*Assistant Examiner* — Jason C Smith
(74) *Attorney, Agent, or Firm* — James Ray & Assoc (57) ABSTRACT

A draft gear assembly for cushioning both buff and draft dynamic impact forces being applied to a center sill member of a railway vehicle includes a housing member closed at one end and open at an opposed end, the housing member having a rear portion adjacent the closed end and a front portion adjacent the open end. At least one compressible elastomeric spring is positioned within the rear portion and has a rear end thereof abutting at least a portion of an inner surface of the closed end. A friction clutch mechanism is also provided in abutting engagement with each of the front end of the compressible elastomeric spring and the coupler shank. The housing member may be provided with a pair of ledge portions disposed intermediate its ends and attachment members disposed on the open end for attaching the housing member directly to the coupler shank.

15 Claims, 11 Drawing Sheets

U.S. PATENT DOCUMENTS

| | | |
|---|---|---|
| 4,735,328 A | 4/1988 | Carlstedt |
| 5,152,409 A | 10/1992 | Sommerfeld |
| 5,312,007 A * | 5/1994 | Kaufhold et al. ............ 213/75 R |
| 5,351,844 A * | 10/1994 | Carlstedt .......................... 213/44 |
| 5,529,194 A | 6/1996 | Merker, Jr. et al. |
| 5,590,797 A | 1/1997 | Duffy et al. |
| 6,446,820 B1 * | 9/2002 | Barker et al. ............... 213/75 R |
| 6,478,173 B2 | 11/2002 | Carlstedt |
| 6,488,162 B1 * | 12/2002 | Carlstedt .................... 213/75 R |
| 6,520,360 B1 | 2/2003 | Withall et al. |
| 6,681,943 B2 * | 1/2004 | Barker et al. ............... 213/75 R |
| 7,264,130 B2 | 9/2007 | Sommerfeld et al. |
| 2005/0011852 A1 * | 1/2005 | Fetterolf et al. ............ 213/75 R |
| 2005/0155947 A1 * | 7/2005 | Sommerfeld et al. ...... 213/75 R |
| 2006/0043045 A1 * | 3/2006 | Sommerfeld ............... 213/75 R |
| 2006/0043450 A1 * | 3/2006 | Tang et al. .................... 257/302 |
| 2008/0272079 A1 * | 11/2008 | Sprainis et al. .................. 213/26 |
| 2008/0272081 A1 * | 11/2008 | Sprainis et al. ............. 213/40 R |
| 2009/0308829 A1 * | 12/2009 | Sprainis et al. ................ 213/32 |

* cited by examiner

ELASTOMERIC DRAFT GEAR HAVING A HOUSING

CROSS-REFERENCE TO RELATED APPLICATIONS

This application is related to and claims priority from Provisional Patent Application Ser. No. 60/926,987 filed on May 1, 2007. This application is further closely related to co-pending U.S. Ser. No. 12/150,809 entitled "Compressible Elastomeric Spring", to co-pending U.S. Ser. No. 12/150,926 entitled "Plate For A Compressible Elastomeric Spring", to co-pending U.S. Ser. No. 12/150,928 entitled "Elastomeric Pad For A Compressible Elastomeric Spring", to co-pending U.S. Ser. No. 12/150,929 entitled "Method of Making Compressible Elastomeric Spring", to co-pending U.S. Ser. No. 12/150,925 entitled "Method Of Making Elastomeric Pad For A Compressible Elastomeric Spring", to co-pending U.S. Ser. No. 12/150,777 entitled "Combination Yoke and Elastomeric Draft Gear", and to co-pending U.S. Ser. No. 12/150,808 entitled "Combination Yoke and Elastomeric Draft Gear Having A Friction Mechanism", filed concurrently herewith. These applications are being assigned to the assignee of the present invention and the disclosures of these co-pending applications are hereby incorporated by reference thereto.

FIELD OF THE INVENTION

The present invention relates, in general, to draft gear assemblies for railway vehicles and, more particularly, this invention relates to a draft gear assembly having a housing, a friction type mechanism installed within the open front end of the housing and a novel elastomeric compressible spring installed within closed rear end of the housing for cushioning dynamic impact forces that are usually encountered in operation of the railway vehicle.

BACKGROUND OF THE INVENTION

Draft gear assemblies for cushioning buff and draft shocks encountered during make-up and operation of a railway vehicle are well known in the art to include a housing having a closed end and an open end, a compressible member disposed within the closed end and a friction mechanism disposed within the open end. A representative teaching of prior art friction clutch mechanisms can be found in U.S. Pat. Nos. 2,916,163; 3,178,036; 3,447,693; 4,556,678; 4,576,295; 4,591,059; 4,645,187; 4,735,328; 5,152,409; 5,351,844; 5,529,194; 5,590,797; 6,478,173; 6,488,162; 6,520,360 and 7,264,130. Most, if not all, of these prior art type draft gear assemblies either have been or still are being utilized in the railway industry prior to the development of the present invention. Furthermore, except for U.S. Pat. Nos. 4,576,295; 4,591,059; 4,735,328 5,351,844; 6,478,173; 6,488,162; and 6,520,360, each of the remaining above-identified patents is owned by the assignee of the present invention. The teachings of each of the above-referenced patents are incorporated herein by reference thereto.

Lately, various railroads and operators of railway vehicles have been seeking to increase loading capacity of the railway vehicles, such as freight cars, and increase the capability of the draft gear assembly to withstand higher dynamic impact forces.

In an attempt to accommodate such increased loading capacity and to withstand higher dynamic impact forces, the compressible member has been provided as a stack of elastomeric pads separated by plates. The pads and plates are positioned transversely to the longitudinal axis of the housing. Each pad is compressed along the longitudinal central axis toward the rear of the draft gear to cushion the buff dynamic impact forces (shocks) and is compressed along the same longitudinal axis toward the front of the draft gear to cushion the draft dynamic impact forces (shocks). During pad compression, each plate moves along the longitudinal axis during cushioning the buff and draft dynamic impact forces (shocks). The pad is manufactured from either from a thermoset material such as rubber or from a thermoplastic copolyester material. Copolyester material manufactured under Hytrel brand by DuPont de Numerous is a common material in the draft gear art.

U.S. Pat. No. 6,520,360 issued to Withall et al. and U.S. Pat. No. 6,478,173 issued to Carlstedt disclose one type of such draft gear assembly wherein a pair of adjacent pads is separated by a plate and wherein a center rod is provided and is mounted through apertures formed in each plate and pad.

U.S. Pat. Nos. 6,488,162 and 5,351,844, both issued to Carlstedt, disclose another type of such draft gear assemblies wherein each pad is disposed between a pair of plates.

The teachings of each of the above-referenced patents are incorporated herein by reference thereto.

While such devices have acceptable energy absorption capacities, the use of a center rod independently or in combination with additional plates increases both the weight and cost of the draft gear assemblies.

Therefore, there is a continuing need for a lightweight and cost effective draft gear employing compressible elastomeric spring and capable of withstanding a higher impact forces during cushioning of buff and draft dynamic impact forces (shocks).

SUMMARY OF THE INVENTION

The present invention provides a draft gear assembly for cushioning both buff and draft dynamic impact forces being applied to a center sill member of a railway vehicle during make-up of a train consist and in-track operation of such train consist. The draft gear assembly is disposed between a pair of front stops and an axially opposed pair of rear stops attached to the center sill member. The draft gear assembly includes a housing member closed at one end and open at an opposed end. The housing member has a rear portion adjacent the closed end and a front portion adjacent the open end. The front portion is being in open communication with the rear portion along a central axis of the housing member. At least one compressible elastomeric spring cushioning element is also provided and is positioned at least coaxially with the central axis within the rear portion. The at least one compressible elastomeric spring cushioning element has a rear end thereof abutting at least a portion of an inner surface of the closed end of the housing member. The at least one compressible elastomeric spring cushioning element extends longitudinally from the closed and includes a predetermined plurality of elastomeric pads disposed coaxially and in series with each other. There is also a predetermined plurality of plate like members disposed in a predetermined pattern relative to the each of the predetermined plurality of pads. The pads and plate like members form in combination a multi-tiered stack having a predetermined initial height. Each pad compresses and extends along the central axis causing movement of the plate like members along the central axis when the dynamic impact forces are applied to and removed from the draft gear assembly.

According to one aspect of the present invention, each of the predetermined plurality of pads is manufactured from a predetermined material and has each of a molecular structure and a predetermined shape factor enabling repetitive absorption and dissipation of dynamic impact forces in excess of about one hundred thirty percent (130%) of ultimate tensile strength of the predetermined material.

According to another aspect of the present invention, each pad has a peripheral side surface and a pair of axial ends. Each of the pair of axial ends has a surface thereof disposed normal to a central axis of the at least one compressible elastomeric spring cushioning element. Each plate like member is disposed between a pair of the pads and has a first flat surface thereof abuttingly engaging an axial end of one of the pair of pads and an opposed second surface thereof abuttingly engaging an axial end of an opposed one of the pair of pads. An axial aperture is formed through each of the plurality of such separator plate like members concentric with the longitudinal axis of the spring stack. There is means which is at least one of secured to and formed integral with each of the plurality of separator plate like members and positioned on or in close proximity to a peripheral side surface of the axial aperture for mechanically interlocking each of the plurality of separator plate like members with each of the pair of pads when a predetermined force is applied axially to one end of the stack during forming thereof.

According to yet another aspect of the present invention, each pad has a peripheral side surface and a pair of axial ends. Each of the pair of axial ends has a surface thereof disposed normal to a central axis of the at least one compressible elastomeric spring cushioning element. Each plate like member is disposed between a pair of the pads and has a first flat surface thereof abuttingly engaging an axial end of one of the pair of pads and an opposed second surface thereof abuttingly engaging an axial end of an opposed one of the pair of pads. A predetermined plurality of first prongs are disposed on the first surface of the separator plate each having a trapezoidal shape and extending outwardly from the first surface for mechanically interlocking the each separator plate with one of the pair of pads when a predetermined compressible force is applied along the central axis to one end of the stack during forming thereof. A predetermined plurality of second prongs are disposed on the second surface of the separator plate each having the trapezoidal shape and extending outwardly from the second surface for mechanically interlocking the each separator plate with an opposed one of the pair of pads when the predetermined compressible force is applied along the central axis to one end of the stack during forming thereof.

According to a further aspect, the present invention provides means which is disposed on and secured to the open end for attaching the housing member directly to a coupler shank of such railway vehicle.

OBJECTS OF THE INVENTION

It is, therefore, one of the primary objects of the present invention to provide a draft gear assembly for cushioning buff and draft dynamic impact forces encountered in operation of a railway vehicle.

Another object of the present invention is to provide a railway vehicle draft gear assembly that employs compressible elastomeric spring mounted within a closed rear end of the draft gear housing and a friction mechanism which is mounted within an open front end of the draft gear housing.

Yet another object of the present invention is to provide a railway vehicle draft gear assembly that employs compressible elastomeric spring having mechanically interlocked elastomeric pads and plates.

A further object of the present invention is to provide a railway vehicle draft gear assembly that employs a compressible elastomeric spring that does not require the use of a center rod.

Yet a further object of the present invention is to provide a railway vehicle draft gear assembly that will at least meet and even exceed all AAR requirements, presently in force, even though such draft gear assembly is lighter in weight.

An additional object of the present invention is to provide a railway vehicle draft gear assembly that will fit into the standard AAR 24.63 inch draft gear pocket.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a railway vehicle applies but is not limited to passenger railcar, freight railcar, locomotive and the like railway vehicles.

The best mode for carrying out the invention is presented in terms of its various embodiments, herein depicted within FIGS. 1 through 13. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only several particular configurations shall be shown and described for purposes of clarity and disclosure and not by way of limitation of scope.

The present invention provides a draft gear assembly which is installed in alignment with a center sill member of a railway vehicle (not shown) between a pair of rear and front stops for cushioning both buff and draft dynamic impact forces (shocks) being applied to the center sill member of the railway vehicle (not shown) during make-up of a train consist and in-track operation of such train consist. The essential elements of the draft gear assembly of the present invention include a housing member and at least one compressible elastomeric spring cushioning element operatively positioned within the housing member. An optional member may be disposed in the open front end of the housing for receiving the dynamic impact forces directly from the coupler shank. The draft gear assembly of the present invention is sized to fit into a standard American Association of Railroads (AAR) 24.63 inch long draft gear pocket 6, best shown in FIG. 4.

It is presently preferred for such resilient cushioning member to be constructed substantially identical, except for length, to the compressible elastomeric spring 102 disclosed in a co-pending U.S. Ser. No. 12/150,809 entitled "Compressible Elastomeric Spring" filled concurrently therewith. It is further presently preferred to provide the plates as disclosed in the co-pending U.S. Ser. No. 12/150,926 "Plate For A Compressible Elastomeric Spring" and provide the elastomeric pads as disclosed in the co-pending U.S. Ser. No. 12/150,928 entitled "Elastomeric Pad For A Compressible Elastomeric Spring". Thus, for the sake of brevity, the detail description of pads, plates and mechanical interlocking means therebetween will be omitted in this application.

Figure 1:
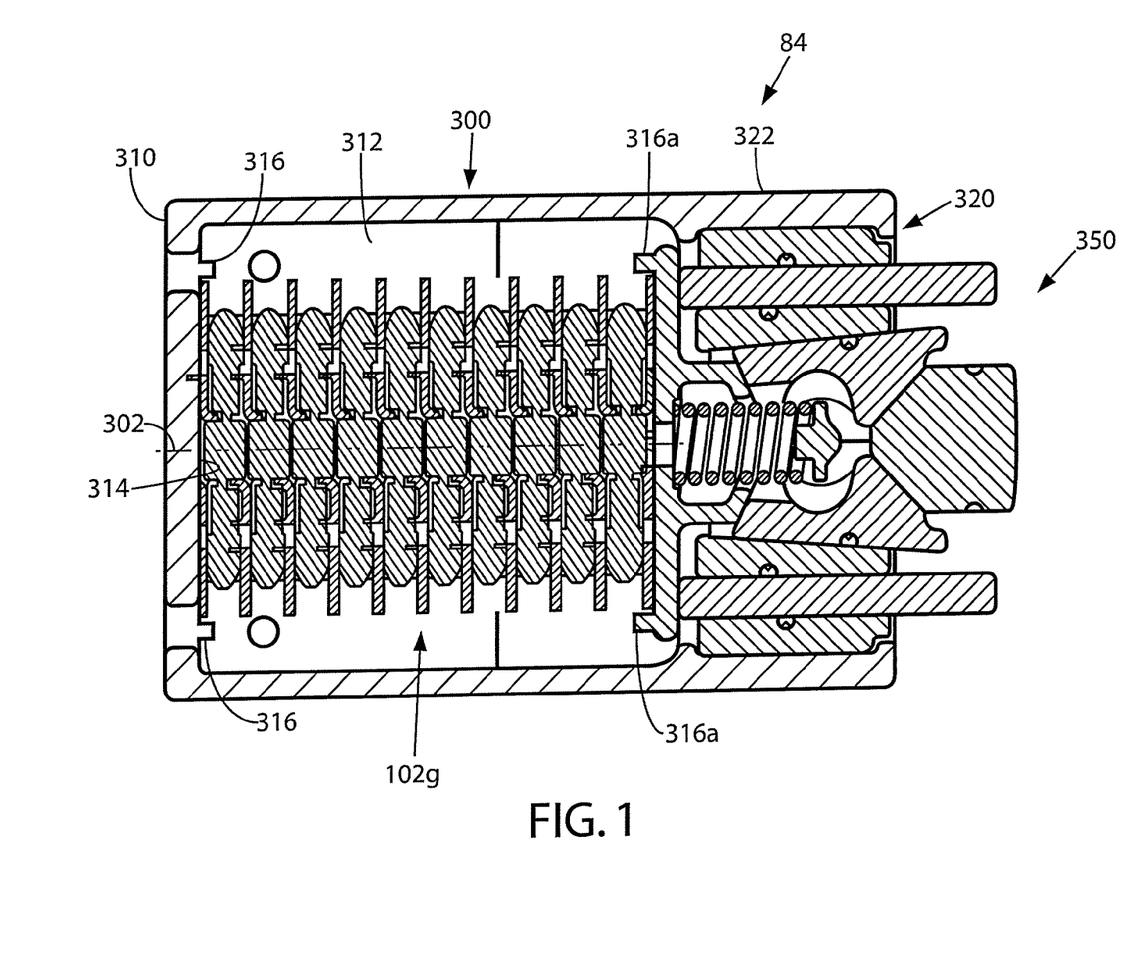
FIG. 1 is a longitudinal cross-sectional view incorporating one form of a draft gear assembly of a presently preferred embodiment of the invention.

Now in reference to FIG. 1 and in accordance with one embodiment of the invention, there is provided a draft gear assembly, generally designated as 84. The draft gear assembly 84 includes a housing member, generally designated as 300. The housing member 300 is closed at a rear end 310 and open at the opposed front end 320. The housing member 300 also has a rear portion 312 disposed adjacent the closed end 310 and a front portion 322 disposed adjacent the open end 320. The front portion 322 is in open communication with the rear portion 312 along a central axis 302 of the housing member 300. The housing member 300 of FIG. 1 is substantially identical to the housing member 18 disclosed in the U.S. Pat. No. 5,590,797 to Duffy et al. and which is owned by the assignee of the present invention. Teachings of U.S. Pat. No. 5,590,797 are incorporated into this document by reference thereto. However, other prior art housing types can be also used in the draft gear assembly 84 of the present invention.

A compressible elastomeric spring, generally designated as 102g, is constructed substantially identical, except for length, to the spring 102 in the co-pending U.S. Ser. No. 12/150,809 entitled "Compressible Elastomeric Spring" and is positioned centrally within the rear portion 312 and extends longitudinally from the closed end 310.

A rear end of the spring 102g abuts at least a portion of an inner surface 314 of the closed end 310 of the housing member 300. Although the front end of the spring 102g, particularly employing the plate like member 150 may directly abut a coupler shank 12, the present invention provides for means disposed in abutting engagement with a front end of the spring 102g and with a coupler shank end 12 for at least partially transferring the dynamic impact forces from the coupler 10 to the spring 102g. The present invention contemplates that the pad 110 employed within the which is preferably manufactured from a predetermined material having each of a molecular structure and a predetermined shape factor enabling repetitive absorption and dissipation of dynamic impact forces in excess of about one hundred thirty percent (130%) of ultimate tensile strength of said predetermined material. It has been found that such pads 110 improve cushioning capacity of the spring 102g. Such pad 110 may be simply interlocked to each plate 150, 190 with plurality of protrusions 160.

The present invention also contemplates that in the most preferred embodiment of the draft gear assembly 84 of FIG. 1, the spring 102g will employ interlocking means including prongs 170 (170a, 170b) and axial aperture 180 provided in each plate 150, 190 as well as protrusions 130 and grooves 140 provided on each axial end 112, 114 of the pad 110.

Figure 6:
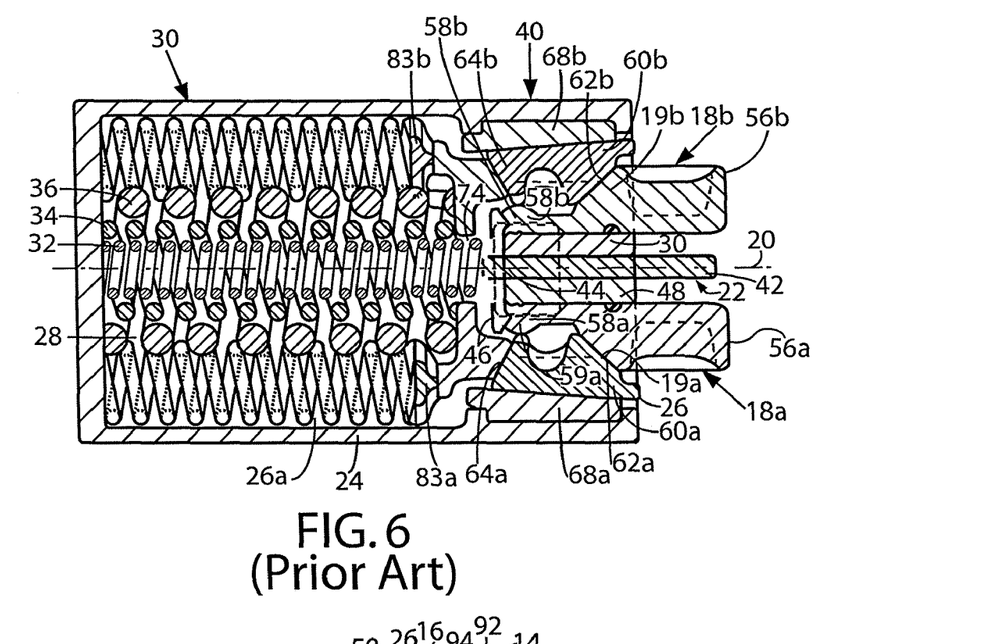
FIG. 6 is a cross-sectional longitudinal view of another prior art draft gear assembly.
Figure 7:
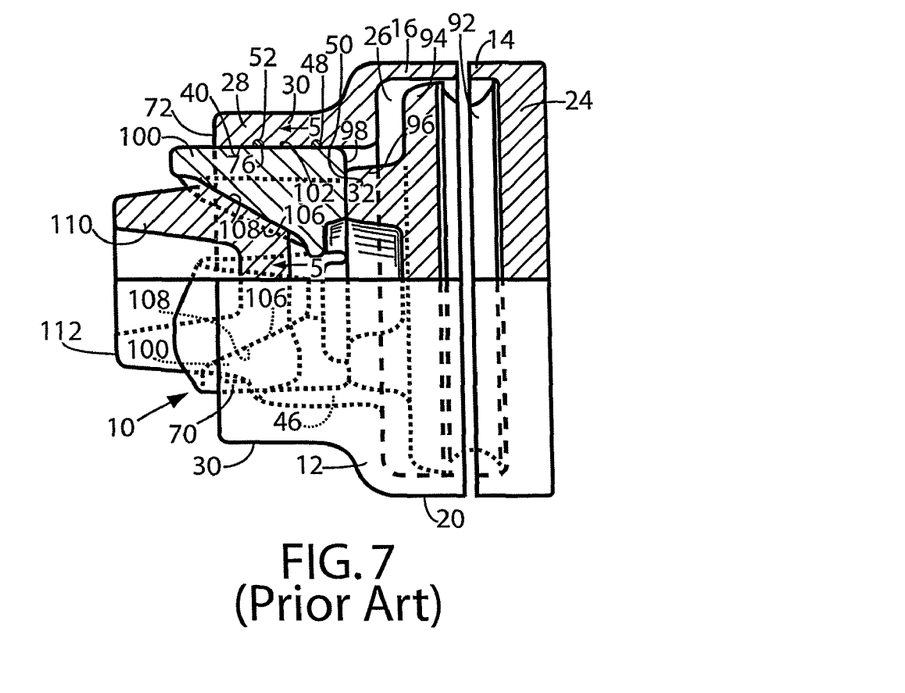
FIG. 7 is a cross-sectional longitudinal view of yet another prior art draft gear assembly.
Figure 8:
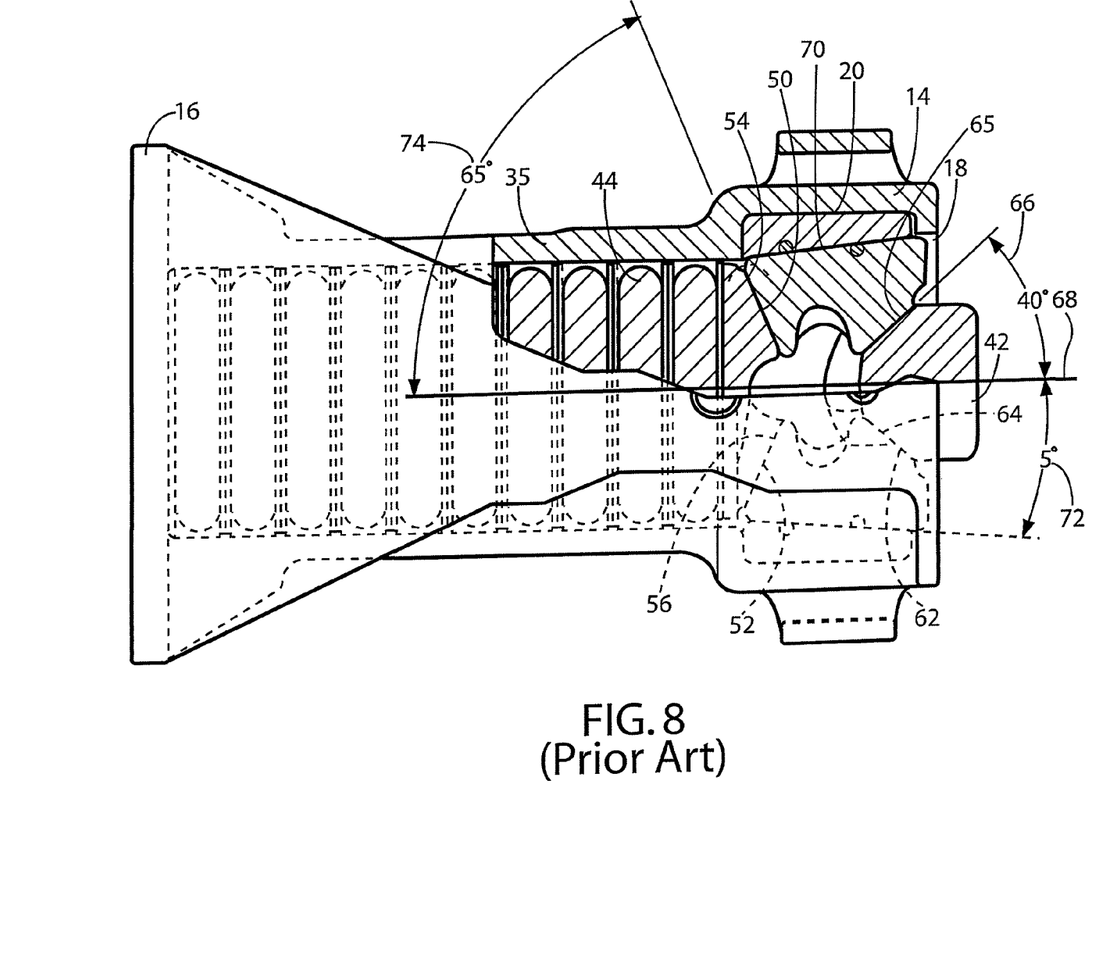
FIG. 8 is a cross-sectional longitudinal view of a further prior art draft gear assembly.
Figure 9:
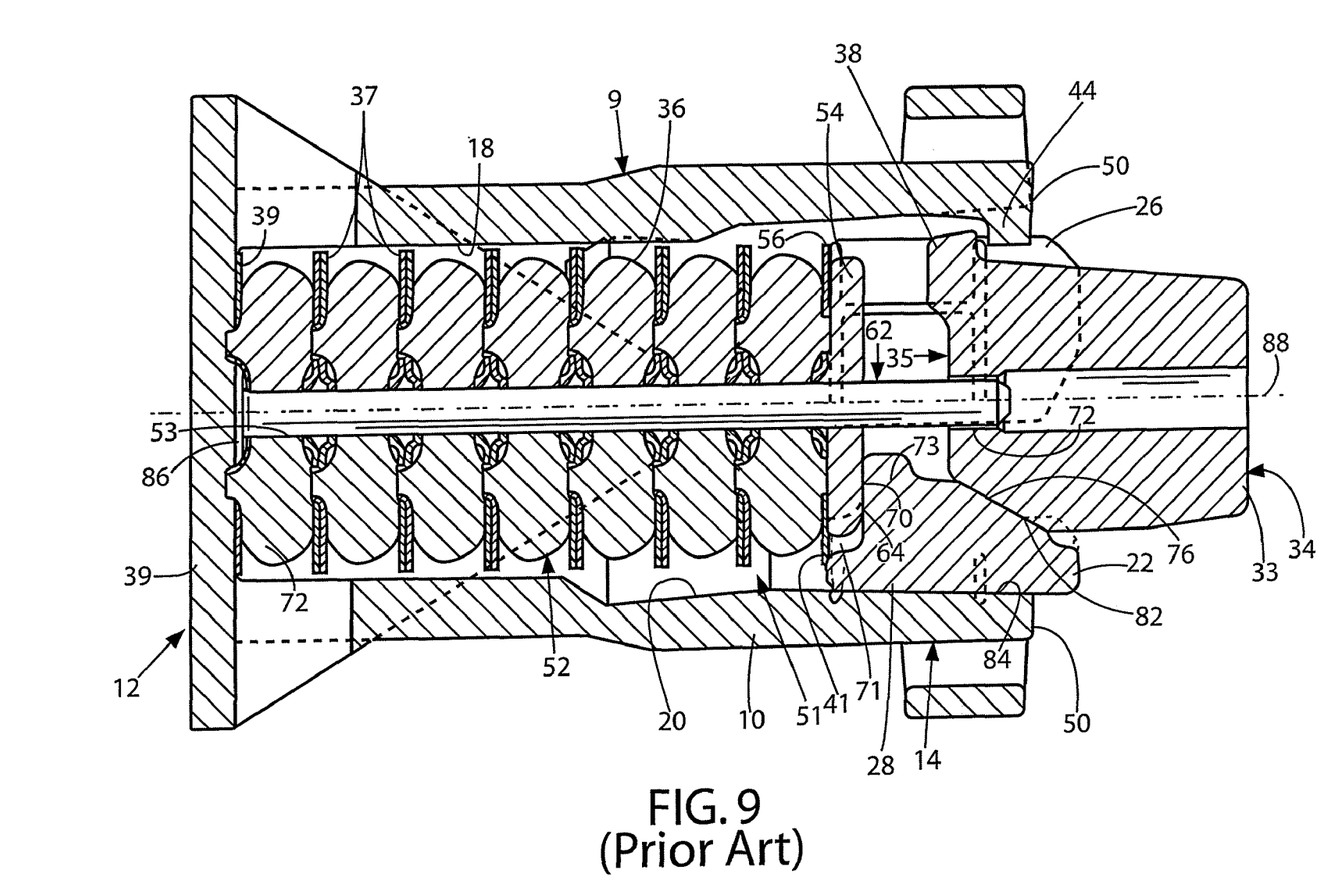
FIG. 9 is a cross-sectional longitudinal view of another prior art draft gear assembly.
Figure 10:
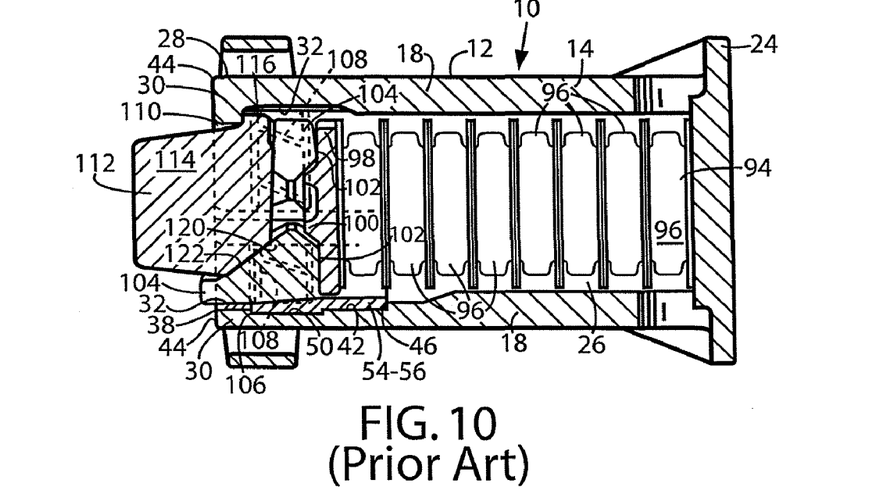
FIG. 10 is a cross-sectional longitudinal view of yet another prior art draft gear assembly.
Figure 11:
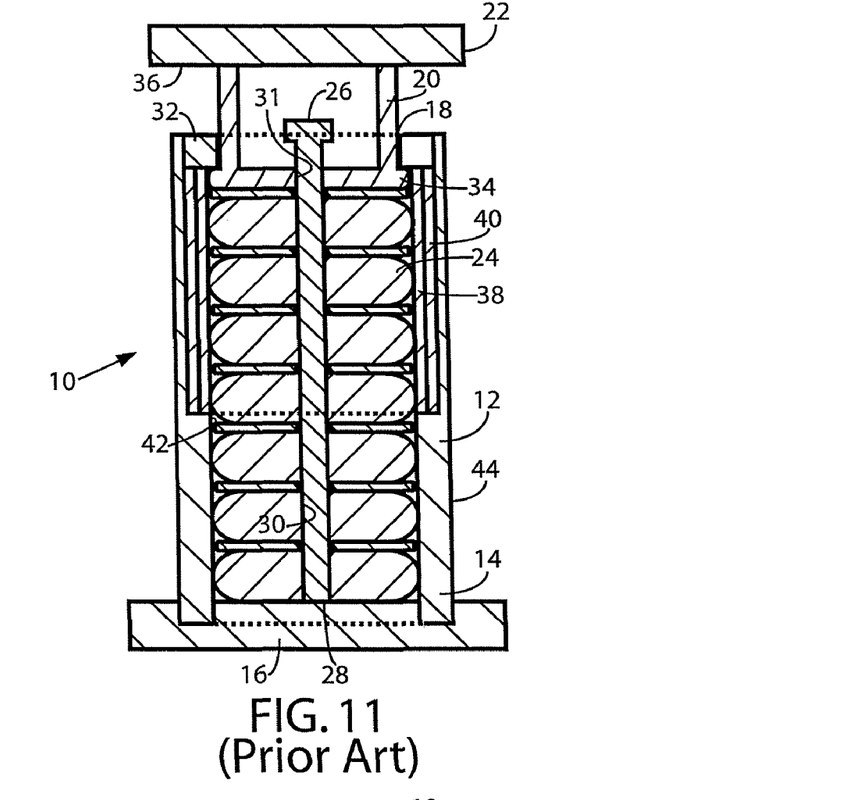
FIG. 11 is a cross-sectional longitudinal view of a further prior art draft gear assembly.
Figure 12:
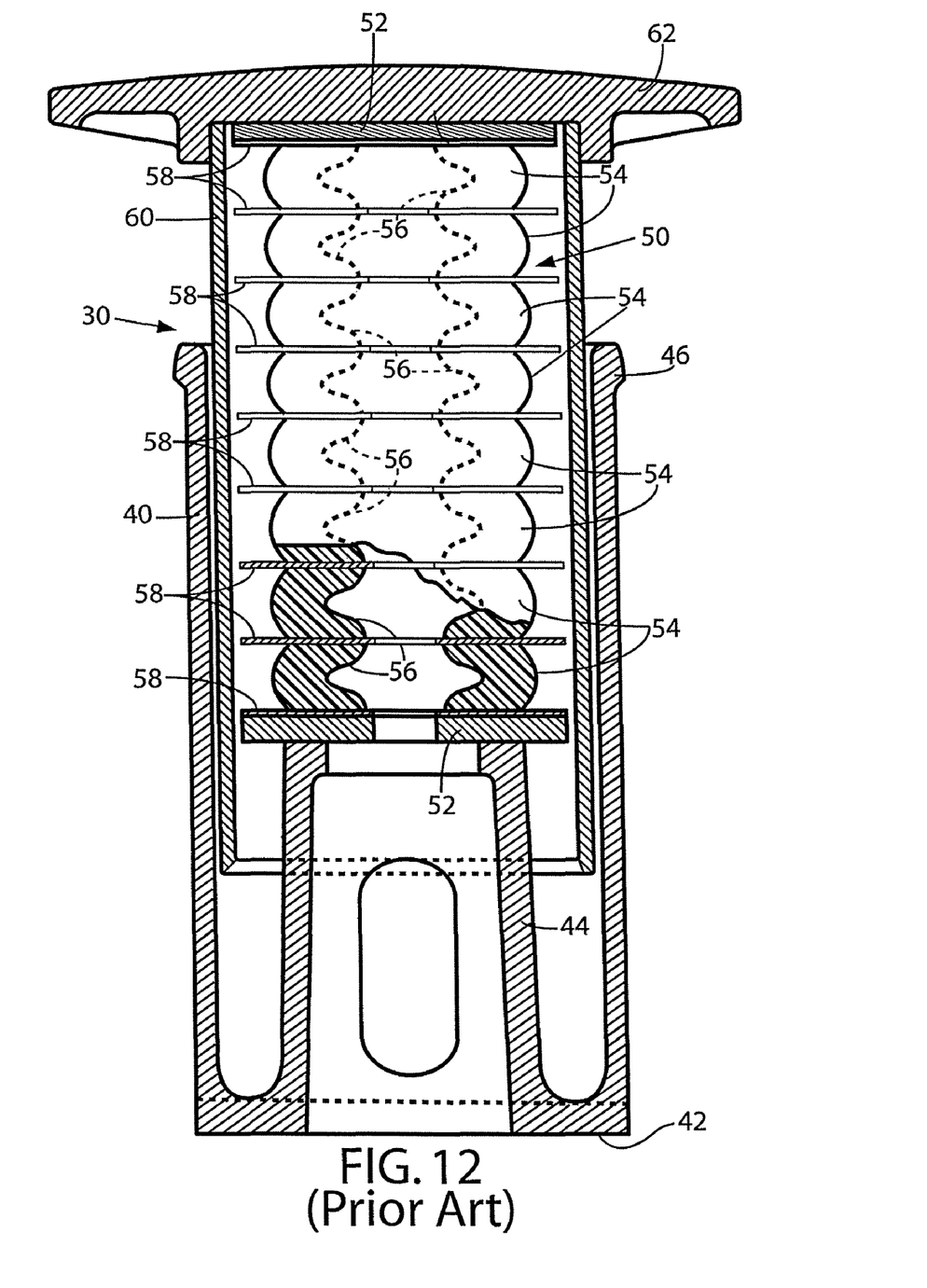
FIG. 12 is a cross-sectional longitudinal view of another prior art draft gear assembly.
Figure 13:
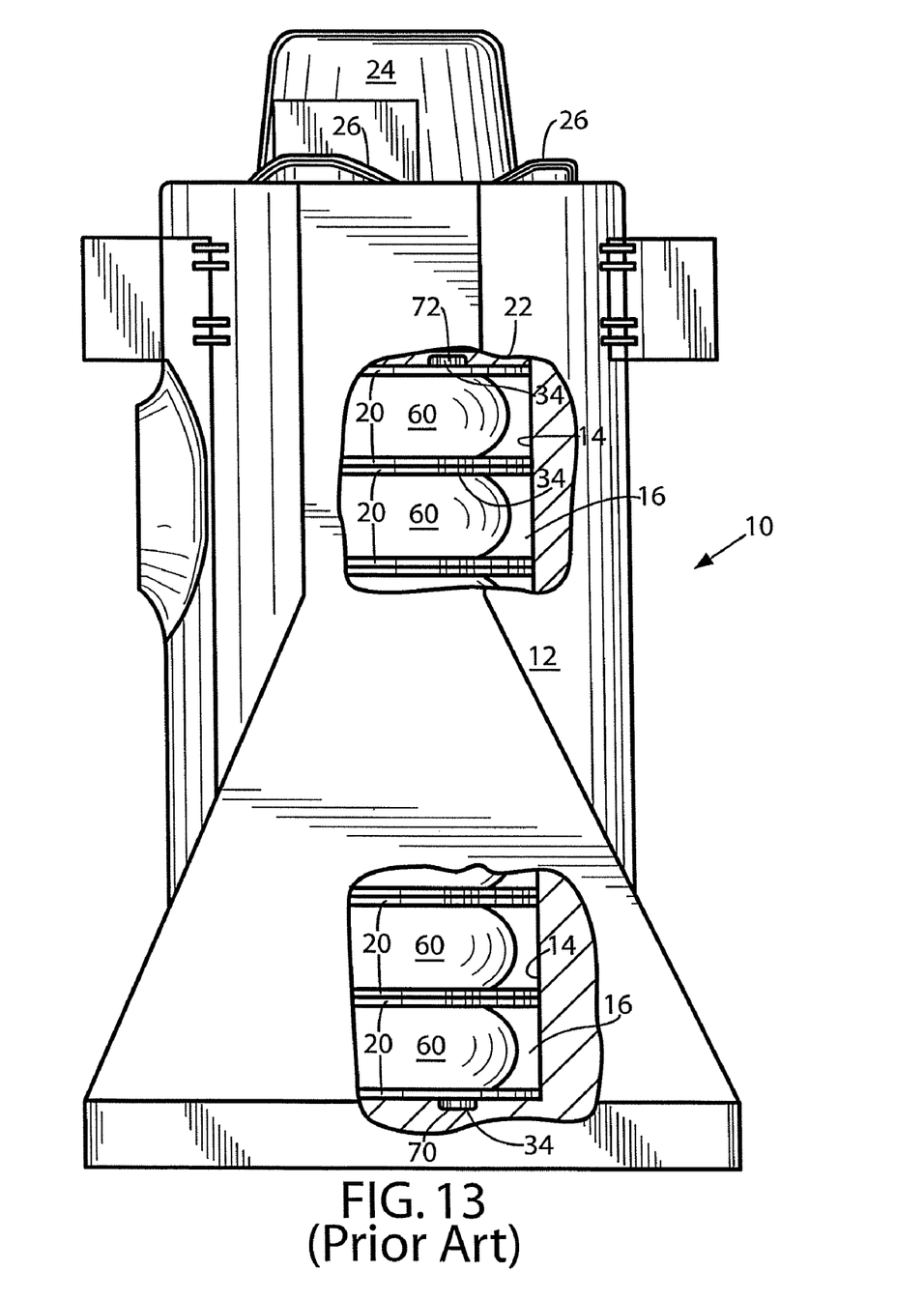
FIG. 13 is a side elevation view of yet another prior art draft gear assembly.

In the draft gear assembly 84 of FIG. 1, the force receiving means is of a friction cushioning clutch type, generally designated as 350, having a longitudinal axis thereof aligned with the central axis 302 of the housing member 300 and the longitudinal axis of the compressible elastomeric spring cushioning element 102g. Such friction cushioning mechanism 350 is substantially identical to the friction clutch mechanism 20 of the U.S. Pat. No. 5,590,797 which is shown in FIG. 6 labeled as "Prior Art".

It is within the scope of the present invention employ other existing friction cushioning clutch type mechanisms. For example, such friction cushioning mechanisms may be of the type as disclosed in U.S. Pat. No. 4,735,328 (see FIG. 6 labeled as "Prior Art"); U.S. Pat. No. 4,576,295 (See FIG. 7 labeled as "Prior Art"); U.S. Pat. No. 6,488,162 (see FIG. 8 labeled as "Prior Art"); U.S. Pat. No. 6,478,173 (see FIG. 9 labeled as "Prior Art"); U.S. Pat. No. 4,591,059 (see FIG. 10 labeled as "Prior Art") and U.S. Pat. No. 5,351,844 (see FIG. 13 labeled as "Prior Art"), whose teachings are incorporated into this document by reference thereto. The center rod employed within the draft gear assembly in U.S. Pat. No. 6,478,173 is not required in the present invention.

Use of other types of the force receiving means is also contemplated in the present invention. By way of another example, such force receiving means may be a plunger 20 disclosed in U.S. Pat. No. 6,520,360 (see FIG. 11 labeled as "Prior Art"). By way of yet another example, such force receiving means may be a cap member 62 disclosed in U.S. Pat. No. 4,556,678 (see FIG. 12 labeled as "Prior Art") and whose teachings are incorporated into this document by reference thereto. In the present invention, such cap member will be simply sized and positioned over the front end of the spring 102g protruding from the open end 320 of the housing member 300.

The draft gear assembly 84 may employ a locating means for locating the rear end of the compressible elastomeric spring cushioning element 102g on the inner surface 314 of the closed end 310 of the housing member 300.

Figure 5:
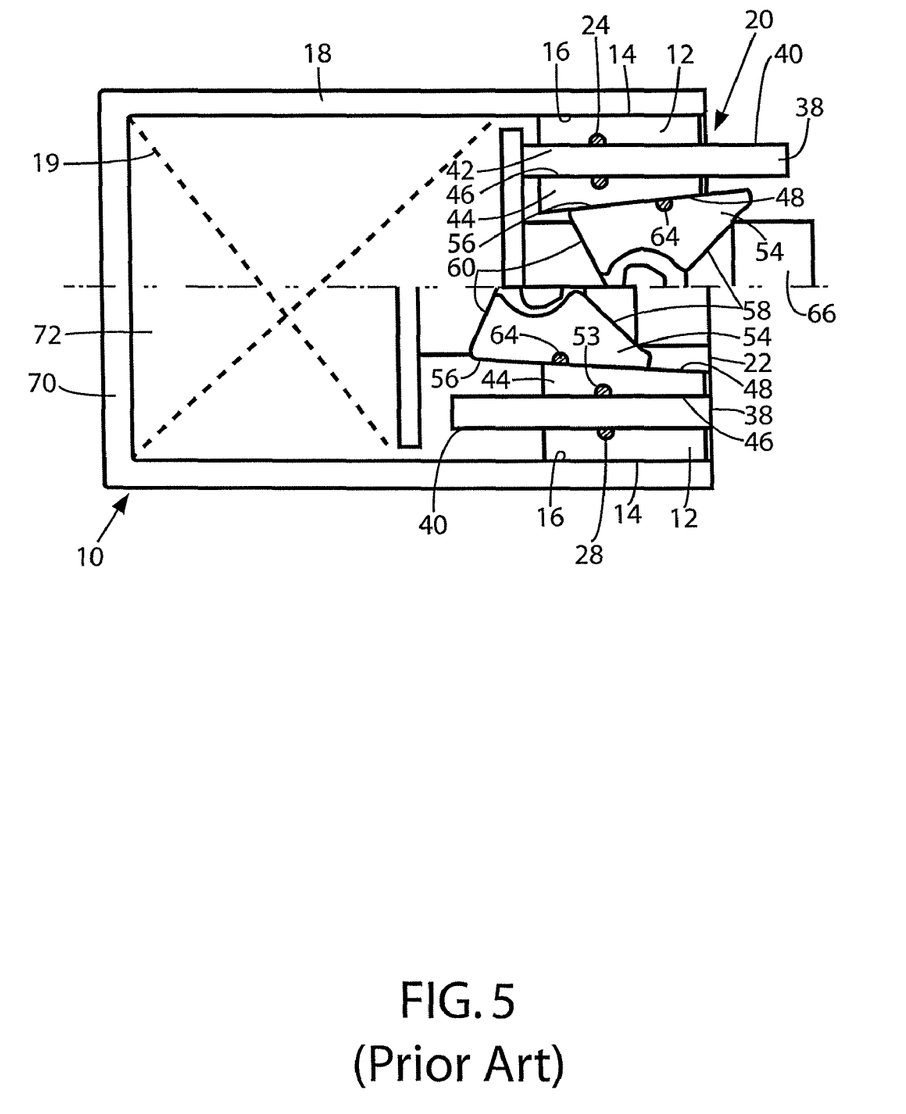
FIG. 5 is a side elevation view of one prior art draft gear assembly.

In accordance with one embodiment of the invention, such locating means may be provided in a generally identical manner as locating end of the spring on the face of the central plate 200 in FIGS. 5-6 of the co-pending U.S. Ser. No. 12/150,777 entitled "Combination Yoke and Elastomeric Draft Gear", except that a face surface of the center plate 200 will be replaced by the inner surface 314 of the closed end 310.

In accordance with another embodiment of the invention, such locating means may include a plurality of raised projections 316 disposed in a predetermined pattern on the inner surface 314 of the closed end 310 and wherein the rear end of the compressible elastomeric spring cushioning element 102g includes an end plate like member 150 which is then caged between the plurality of raised projections 316. Preferably, the projections 316 are formed integral with the surface 314 during manufacturing of the housing member 300.

Similarly, the front end of the compressible elastomeric spring cushioning element 102g may be located on the bottom surface of the friction mechanism 350 by way of raised projections 316a of FIG. 1.

Alternatively, the shape and size of the plate like members 190 may be predetermined so as to position side edges of the plate like members 190 at least in close proximity and with the inner surfaces of the rear end 310 of the housing member 300. Such inner surfaces then provide guiding for the compressible elastomeric spring cushioning element 102g during cushioning of the buff and draft dynamic impact forces.

It would be understood that the draft gear assembly of FIG. 1 installed within the conventional yoke 20 which is disclosed in greater details in the co-pending U.S. Ser. No. 12/150,777 entitled "Combination Yoke and Elastomeric Draft Gear".

The draft gear assembly of FIG. 1 improves the prior art eleastomeric/friction type draft gear assemblies by providing a novel elastomeric compressible spring 102g, having improved mechanical interlocking arrangement between the plates and pads as well as providing pad 110 which is manufactured from the copolyester polymer material by a method that enables the elastomeric compressible spring to absorb and cushion higher dynamic impact forces.

Figure 2:
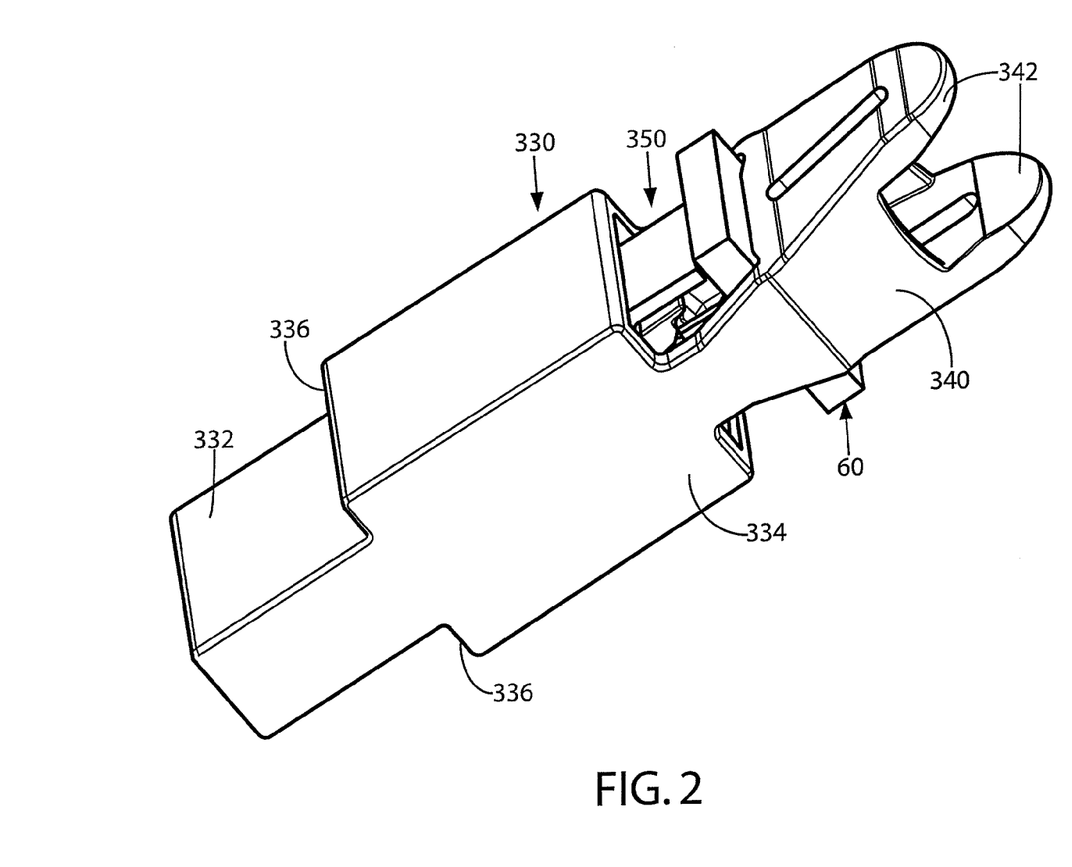
FIG. 2 is an isometric view incorporating yet another form of a draft gear assembly of a presently preferred embodiment of the invention.
Figure 3:
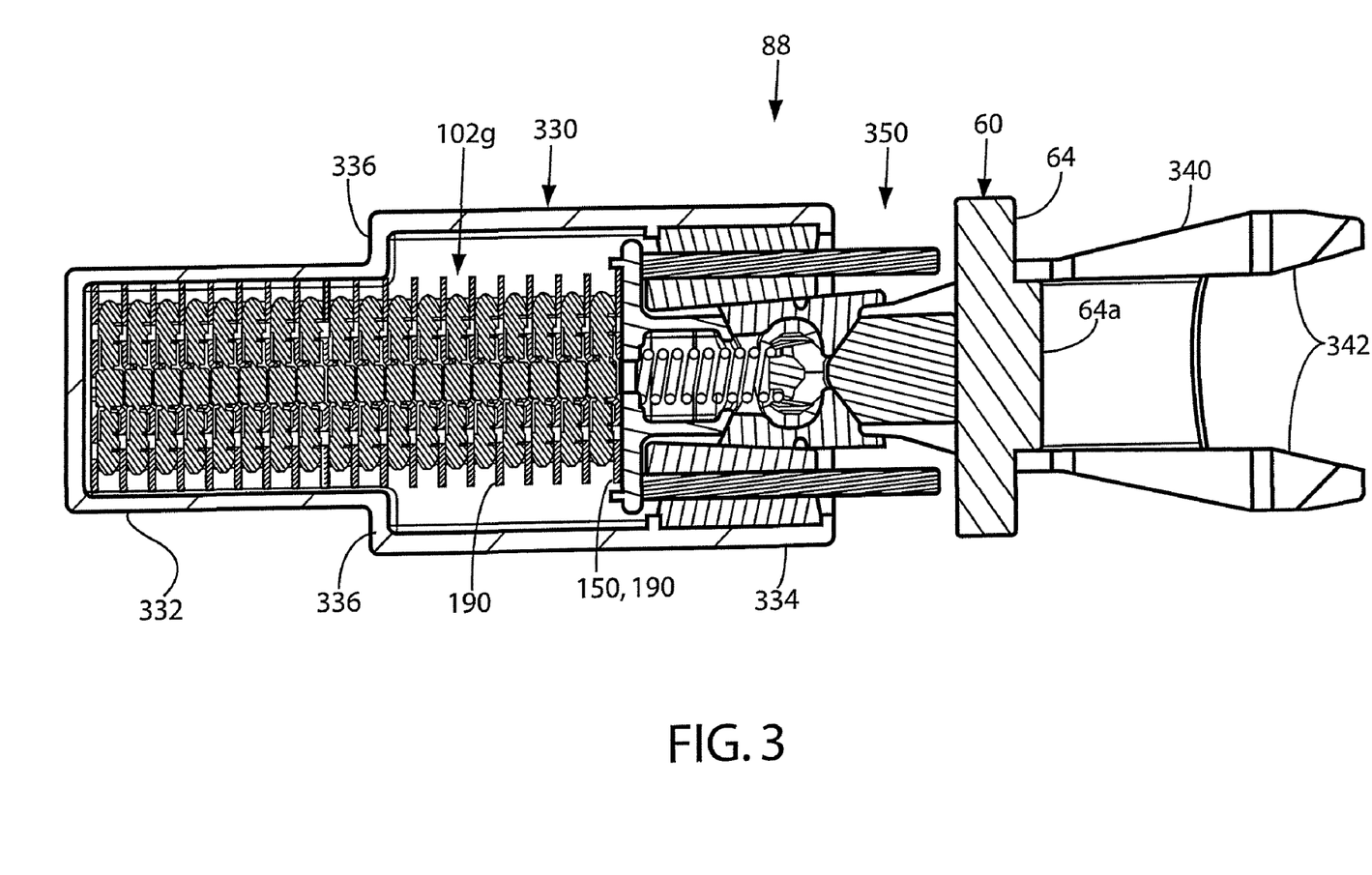
FIG. 3 is a longitudinal cross-sectional view of the draft gear assembly of FIG. 2.
Figure 4:
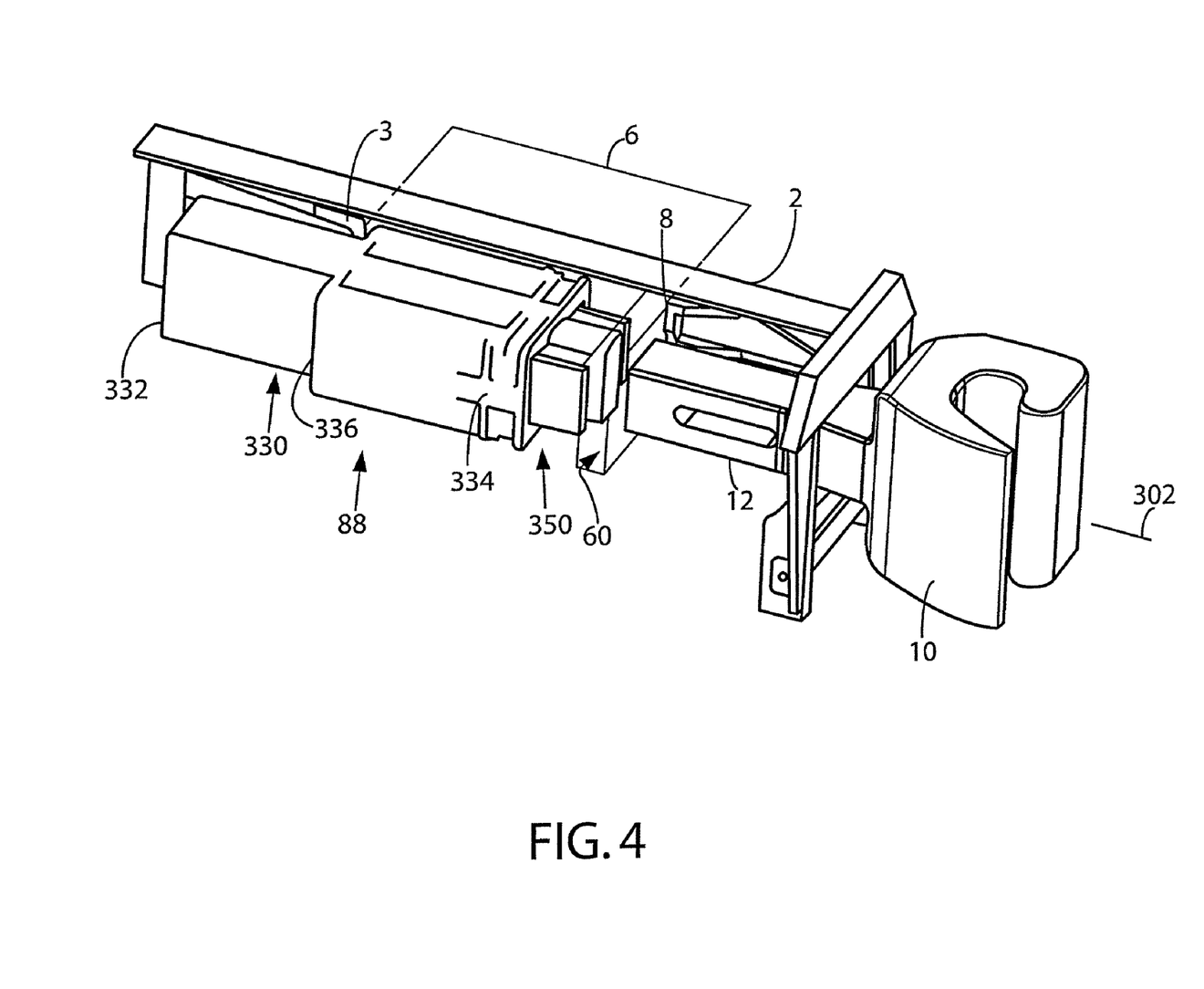
FIG. 4 is an isometric view of the draft gear assembly of FIG. 2, particularly illustrating the installation of such draft gear assembly within a center sill of the railway vehicle.

Now in reference to FIGS. 2-4, there is illustrated a draft gear assembly, generally designated as 88, which is constructed in accordance with yet another embodiment of the invention. The draft gear assembly 88 includes the same friction cushioning mechanism 350 and the same compressible elastomeric spring cushioning element 102g that is employed within the draft gear assembly of FIG. 1. However, the housing member, generally designated as 330, includes a pair of ledge members 336 disposed intermediate the rear and front ends 332 and 334 respectively. Such pair of ledge members 336 abuttingly engage the pair of rear stops 3 and enable the rear end 332 of the housing member 330 to extend a predetermined distance into the sill 2 between the pair of rear stops 336. The housing 330 is disclosed and described in details in U.S. Pat. No. 7,264,130 to Sommerfeld et al., whose teachings are incorporated into this document by reference thereto. Advantageously, the shape and size of the plate like members 150, 190 is determined so as to position side edges of the plate like members 190 at least in close proximity and, preferably in abutting engagement with the inner surfaces of the rear end 332 of the housing member 330, which then provide guiding for the compressible elastomeric spring cushioning element 102g during cushioning of the buff and draft dynamic impact forces.

The housing member 330 may be further adapted with an attachment means, at least one of formed integral with and rigidly secured to the open front end 334, for attaching the housing member 330 directly to a coupler shank 12 of the railway vehicle (not shown). Although such attachment means is shown as essentially a yokehead-like portion 340 having a pair of keyslot walls 342 for attachment to a standard AAR E-type coupler it is within the scope of the present invention to provide attachment means for attaching the draft gear assembly 88 to standard F-type and R-type couplers. The outer surface 64 of the front coupler follower 60 is then adapted with a raised portion 64a for retaining the front coupler follower 60 between the walls 342. As is known, the housing member 330 employing the above-described attachment means eliminates the need for the yoke 20."

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A draft gear assembly for cushioning both buff and draft dynamic impact forces being applied to a center sill member of a railway vehicle during make-up of a train consist and in-track operation of such train consist, said draft gear assembly being disposed between a pair of front stops and an axially opposed pair of rear stops attached to such center sill member, said draft gear assembly comprising:

(a) a housing member closed at one end and open at an opposed end, said housing member having a rear portion adjacent said closed end and a front portion adjacent said open end, said front portion being in open communication with said rear portion along a central axis of said housing member; and (b) at least one compressible elastomeric spring cushioning element positioned at least coaxially with said central axis within said rear portion and having a rear end thereof abutting at least a portion of an inner surface of said closed end of said housing member, said at least one compressible elastomeric spring cushioning element extending longitudinally from said closed end and defining a longitudinal axis, said at least one compressible elastomeric spring cushioning element including a predetermined plurality of elastomeric pads disposed coaxially and in series with each other, each of said predetermined plurality of pads manufactured from a predetermined material and having at least one of a molecular structure and a predetermined shape factor so that said predetermined plurality of pads repetitively absorb and dissipate the dynamic impact forces applied to said at least one compressible elastomeric spring cushioning element along said longitudinal axis thereof, wherein a ratio between a value of the applied dynamic impact forces and a value of an ultimate tensile strength of said predetermined material is greater than 1.3 to 1, said at least one compressible elastomeric spring cushioning element further including a predetermined plurality of plate like members disposed in a predetermined pattern relative to said each of said predetermined plurality of pads.

2. The draft gear assembly, according to claim 1, wherein said at least one compressible elastomeric spring cushioning element is positioned centrally within said closed end of said housing member.

3. The draft gear assembly, according to claim 1, wherein said draft gear assembly includes means disposed in abutting engagement with each of a front end of said at least one compressible elastomeric spring cushioning element and with a shank end of a coupler for receiving such dynamic impact forces from such coupler.

4. The draft gear assembly, according to claim 3, wherein said dynamic impact force receiving means includes a friction cushioning mechanism disposed at least partially within said front portion and extending outwardly from said open end of said housing member, said friction cushioning mechanism having a longitudinal axis thereof aligned with said central axis of said housing member.

5. The draft gear assembly, according to claim 4, wherein said friction cushioning mechanism includes:
   (a) a pair of outer stationary plate members, each of said pair of outer stationary plate members having an inner and an outer surface, said outer surface being engageable with a respective radially opposed portion of an inner surface of said housing member adjacent said open end thereof;
   (b) a pair of movable plate members, each of said movable plate members having at least a predetermined portion of an outer surface thereof frictionally engageable with a respective said inner surface of said pair of outer stationary plate members for absorbing at least a first portion of heat energy generated during closure of said draft gear assembly caused by such applied dynamic impact forces;
   (c) a pair of inner stationary plate members, each of said inner stationary plate members having an outer surface thereof frictionally engageable with at least a portion of a respective inner surface of said pair of movable plate members for absorbing at least a second portion of such heat energy generated during closure of such draft gear assembly, an inner surface of said each of said inner stationary plate members being tapered at a first predetermined angle;
   (d) a pair of wedge shoe members each including:
      i. a tapered outer surface frictionally engageable with a respective said inner surface of said tapered stationary plate members for absorbing a third portion of heat energy generated during said closure of said draft gear assembly,
      ii. an upper surface tapered from a point disposed inwardly from said tapered outer surface inwardly toward and at an acute angle relative to said longitudinal axis of said friction cushioning mechanism, said tapered upper surface being tapered at a second predetermined angle, and
      iii. a bottom surface tapered from a point disposed inwardly from said tapered outer surface inwardly toward and at an acute angle relative perpendicularly to said longitudinal axis of said friction cushioning mechanism; and
   (e) a center wedge member, said center wedge member including a pair of correspondingly tapered surfaces frictionally engageable with said upper tapered surface of a respective one of said pair of wedge shoe members for absorbing at least a fourth portion of such heat energy generated during said closure of said draft gear assembly.

6. The draft gear assembly, according to claim 5, wherein said draft gear assembly further includes a spring seat member having at least a portion of a first surface thereof abutting said front end of said at least one compressible elastomeric spring cushioning element and a second surface for engaging predetermined portions of said friction cushioning mechanism, said spring seat member being mounted to move longitudinally within said housing member for respectively compressing and releasing said at least one compressible elastomeric spring cushioning element during application and release of said dynamic impact forces on and from said draft gear assembly.

7. The draft gear assembly, according to claim 4, wherein said friction cushioning mechanism includes:
   (a) a series of extended tapered inner surfaces formed within said housing member and opening toward and longitudinally extending from a front portion arranged adjacent said open front end of said housing member;
   (b) a series of friction members equally and annularly spaced about said central axis, each friction member including a first end portion with a first angled surface, a second end portion, and an outer surface between said first and second end portions, with said outer surface being configured to complement one of said extended tapered inner surfaces provided on said housing member such that a first sliding surface is cooperatively defined between said outer surface of each friction member and one of said extended tapered inner surfaces on said housing member with said first sliding surface between said outer surface of each friction member and said extended tapered inner surface on said housing member defining a first predetermined angle relative to said longitudinal axis of said friction cushioning mechanism;
   (c) a wedge arranged for axial movement relative said open front end of said housing member and against which an external force can be applied, said wedge defining a series of outer tapered surfaces configured to complement said first angled surface at a first end portion of each friction member and such that a second sliding surface is cooperatively defined between an outer tapered portions on said wedge and said first angled surface of each friction member and with said second sliding surface defined between the outer tapered portions on said wedge and said first angled surface of each friction member defining a second predetermined angle relative to said longitudinal axis of said friction cushioning mechanism;
   (d) a spring seat arranged within and at a generally normal disposition relative to said central axis of said housing member, said spring seat defining on one side thereof a face configured to complement and engage a second surface arranged adjacent said second end portion of each friction member and such that a third surface is defined at the conjuncture of a face on said spring seat and said second surface on each friction member with said third surface being disposed as to define a third predetermined angle relative to a major axis of said housing member;
   (e) wherein said at least one compressible elastomeric spring cushioning element is positioned between said rear closed end of said housing member and a side of said spring seat opposed to said one side for storing energy generated during compression of said draft gear assembly; and
   (f) wherein said at least one compressible elastomeric spring cushioning element in combination with a configuration of said housing member, said wedge, said friction shoes and said spring seat along with an angularity of said first sliding surface, said second sliding surface and said third surface relative to said major axis of said housing member permit said draft gear assembly to resist dynamic impact forces applied thereto while cushioning such dynamic impact forces over an axial range of operation.

8. The draft gear assembly, according to claim 1, wherein said housing member further includes a pair of ledge members disposed intermediate said closed and open ends, said pair of ledge members abuttingly engaging such pair of rear stops and wherein said closed end of said housing member extends a predetermined distance into such sill between such pair of rear stops.

9. The draft gear assembly, according to claim 1, wherein said housing member further includes an attachment means at least one of formed integral with and rigidly secured to said open end for attaching said housing member directly to a coupler shank of such railway vehicle.

10. The draft gear assembly, according to claim 1, wherein said draft gear assembly further includes a locating means for locating said rear end of said at least one compressible elastomeric spring cushioning element on said inner surface of said closed end of said housing member.

11. The draft gear assembly, according to claim 10, wherein said locating means includes a plurality of raised projections disposed in a predetermined pattern on said inner surface of said closed end and wherein said rear end of said at least one compressible elastomeric spring cushioning element includes an end plate like member caged between said plurality of raised projections.

12. The draft gear assembly, according to claim 1, wherein said at least one compressible elastomeric spring cushioning element includes a single plate like member disposed between a pair of said pads.

13. The draft gear assembly, according to claim 1, wherein said at least one compressible elastomeric spring cushioning element includes each of said plurality of plate like members having one surface thereof abuttingly engaging a respective axial end of said one of said predetermined plurality of pads and having an opposed surface thereof abuttingly engaging a surface of an adjacent plate like member.

14. A draft gear assembly for cushioning both buff and draft dynamic impact forces being applied to a center sill member of a railway vehicle during make-up of a train consist and in-track operation of such train consist, said draft gear assembly being disposed between a pair of front stops and an axially opposed pair of rear stops attached to such center sill member, said draft gear assembly comprising:
  (a) a housing member closed at one end and open at an opposed end, said housing member having a rear portion adjacent said closed end and a front portion adjacent said open end, said front portion being in open communication with said rear portion along a central axis of said housing member; and
  (b) at least one compressible elastomeric spring cushioning element positioned, at least coaxially with said central axis, within said rear end, said at least one compressible elastomeric spring cushioning element having one end thereof abutting at least a portion of an inner surface of said closed end of said housing, said at least one compressible elastomeric spring cushioning element extending longitudinally from said closed end, said at least one compressible elastomeric spring cushioning element including:
  i. a predetermined plurality of elastomeric pads disposed coaxially and in series with each other, each of said predetermined plurality of pads having a peripheral side surface and a pair of axial ends, each of said pair of axial ends has a surface thereof disposed normal to a central axis of said at least one compressible elastomeric spring cushioning element,
  ii. a predetermined plurality of separator plate like members, each of said predetermined plurality of separator plate like members disposed between a pair of said pads, said each separator plate like member having a first substantially flat surface thereof abuttingly engaging an axial end of one of said pair of pads and an opposed second substantially flat surface thereof abuttingly engaging an axial end of an opposed one of said pair of pads, whereby said predetermined plurality of pads and said predetermined plurality of separator plate like members form in combination a multi-tiered stack having a predetermined initial height, and whereby each pad compresses and extends along said central axis causing movement of said separator plate like members along said central axis when such dynamic impact load is applied to and removed from said draft gear assembly,
  iii. a predetermined plurality of first prongs at least one of formed integral with and secured to said first substantially flat surface of said separator plate each having a trapezoidal shape and extending outwardly from said first surface for mechanically interlocking said each separator plate with one of said pair of pads when a predetermined compressible force is applied along said central axis to one end of said stack during forming thereof, and
  iv. a predetermined plurality of second prongs at least one of formed integral with and secured to said second substantially flat surface of said separator plate each having said trapezoidal shape and extending outwardly from said second surface for mechanically interlocking said each separator plate with an opposed one of said pair of pads when said predetermined compressible force is applied along said central axis to one end of said stack during forming thereof.

15. The draft gear assembly of claim 14, further including
  (a) means at least one of formed integral with and secured to said open end for attaching said housing member directly to a coupler shank of such railway vehicle.

* * * * *